United States Patent [19]
Debaets

[11] 3,790,952
[45] Feb. 5, 1974

[54] SYSTEM FOR PRINTING OUT THE METERED FLOW OF A FLUID DAILY OR FOR OTHER PREDETERMINED PERIODS OF TIME

[75] Inventor: Michael P. Debaets, Worthington, Ohio

[73] Assignee: Columbia Gas System Service Corporation, Wilmington, Del.

[22] Filed: Apr. 23, 1973

[21] Appl. No.: 353,700

[52] U.S. Cl. ............ 346/33 R, 346/13 MR, 346/43, 346/78, 346/31, 346/94, 235/94 R, 73/194 M
[51] Int. Cl. ............................................. G01d 9/00
[58] Field of Search .. 346/33 R, 36, 78, 43, 13 MR, 346/94, 31; 235/94 R; 73/194 M, 272 A, 250, 195; 222/30

[56] References Cited
UNITED STATES PATENTS

| | | |
|---|---|---|
| 3,603,481 | 9/1971 | Dilger et al. ...................... 222/30 X |
| 3,508,681 | 4/1970 | Fitzgerald ............................ 222/30 |
| 2,612,420 | 7/1952 | Vroom ............................. 73/194 R |
| 2,086,363 | 7/1937 | McMullen ....................... 346/14 M |

Primary Examiner—Stephen J. Tomsky
Assistant Examiner—Vit W. Miska
Attorney, Agent, or Firm—Harold L. Stults

[57] ABSTRACT

A system for recording the amount of gas which is metered each day by reading-out the unit measurements of a meter which reads a continuing total. The continuing total of the meter is read monthly, and a printer record shows the amount which is consumed each day of the month. The read-out mechanism and an automatic printer are operated by gas flow once every 24 hours under the control of a battery-operated clock. Other selected print out cycles, such as hourly read out, can be selected by utilizing a battery-operated clock of the proper rotation cycle.

17 Claims, 5 Drawing Figures

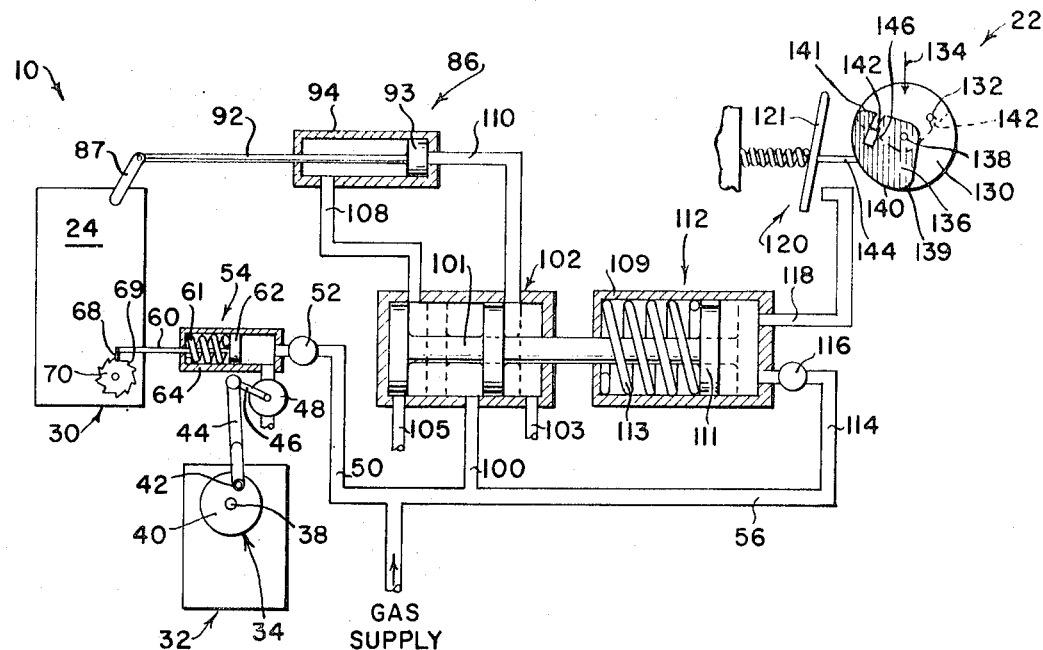
Fig. 1
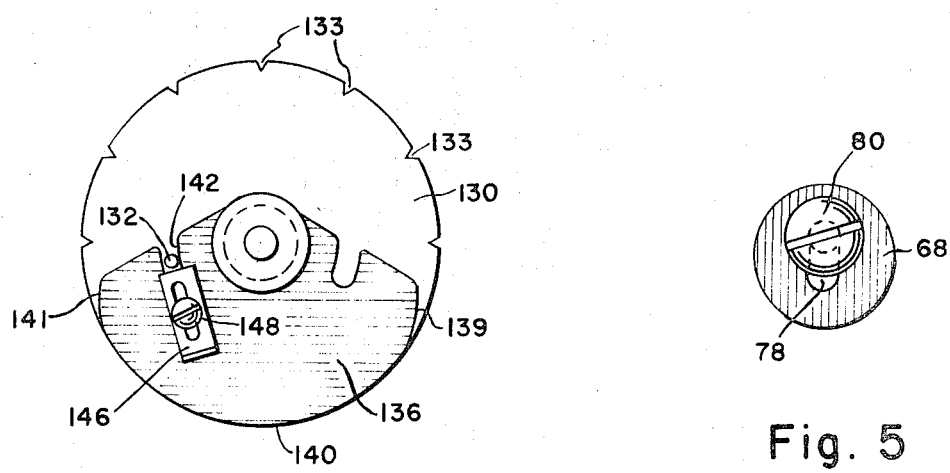
Fig. 4
Fig. 5

SYSTEM FOR PRINTING OUT THE METERED FLOW OF A FLUID DAILY OR FOR OTHER PREDETERMINED PERIODS OF TIME

This invention relates to meter recording devices and systems, and more particularly to systems for printing out the delay volume of gas which passes through a meter, for example, in the supply line to a consumer or in a distribution line.

In the transmission and distribution of fuel gas it is standard practice to measure the volume by a meter which keeps a continuous record. Such meters are read each month or at other stated intervals and the readings are used to calculate the charge for the gas consumed. However, the tariff or charges for gas supplied for certain industrial users are based upon the daily demand, for example, involving a "total daily entitlement feature." For such users it is necessary to obtain a permanent record of the consumption of gas for each day. That may be done by reading the meter each day but that is time consuming and expensive. Therefore, it has been desirable to provide automatic means for producing a permanent record of the total consumption of gas during each day.

Gas meters are generally of either the displacement type or the turbine type, neither of which requires electrical service, the small amount of energy required to turn the meter being derived from the flow of the gas. The avoidance of the necessity of electrical service has obvious advantages, not only from the standpoint of simplification and safety considerations, but also because of the cost and inconvenience involved in providing the electrical service. That is, a gas meter may be located remote from buildings and it is desirable to avoid the cost of extending electric lines to the meter area, and such electric lines may be subject to damage, abuse or deterioration. The same and similar considerations and problems are involved in the transmission and distribution of other fluids.

In view of the above, it is an object of the present invention to provide for printing a record for each day, or other time periods, of the consumption or passage of gas or another fluid measured by a meter A further object is to provide systems of the above type which derive operating power from the flow of the fluid being measured. It is a further object to provide for the above with mechanisms which are simple, dependable and adaptable to various conditions of operation and use.

The above, and other objects, features and advantages of the present invention will be apparent in the following detailed description of an illustrative embodiment thereof, which is to be read in connection with the accompanying drawings, wherein:

FIG. 1 is a schematic representation of a system constituting one embodiment of the invention;

FIG. 4 is an end view of a portion of the timing mechanism on line 4—4 of FIG. 2; and, FIG. 5 is a view on line 5—5 of FIG. 2.

Figure 2:
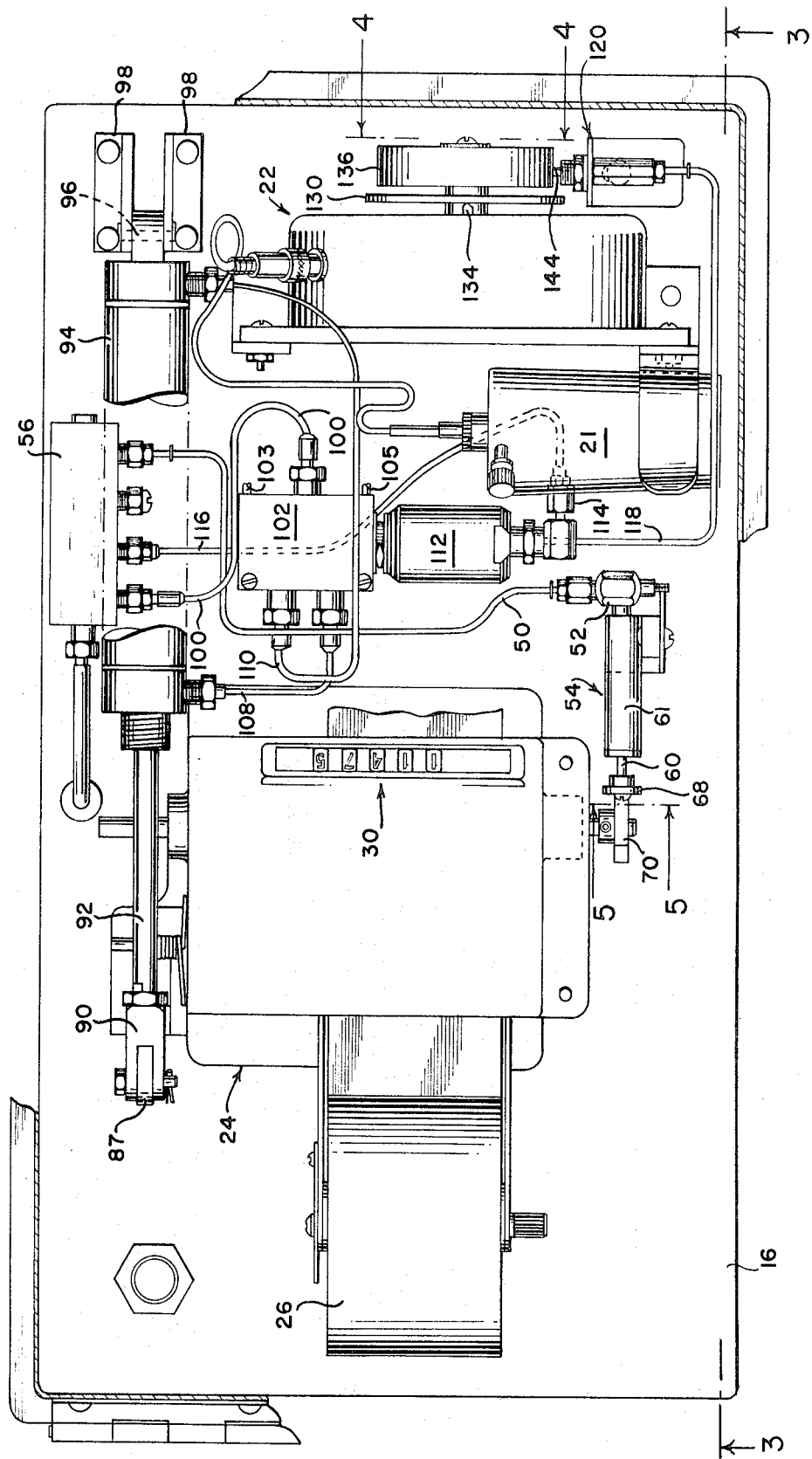
FIG. 2 is a plan view of a system of FIG. 1 with parts broken away for clarity and with the meter and associated parts omitted.
Figure 3:
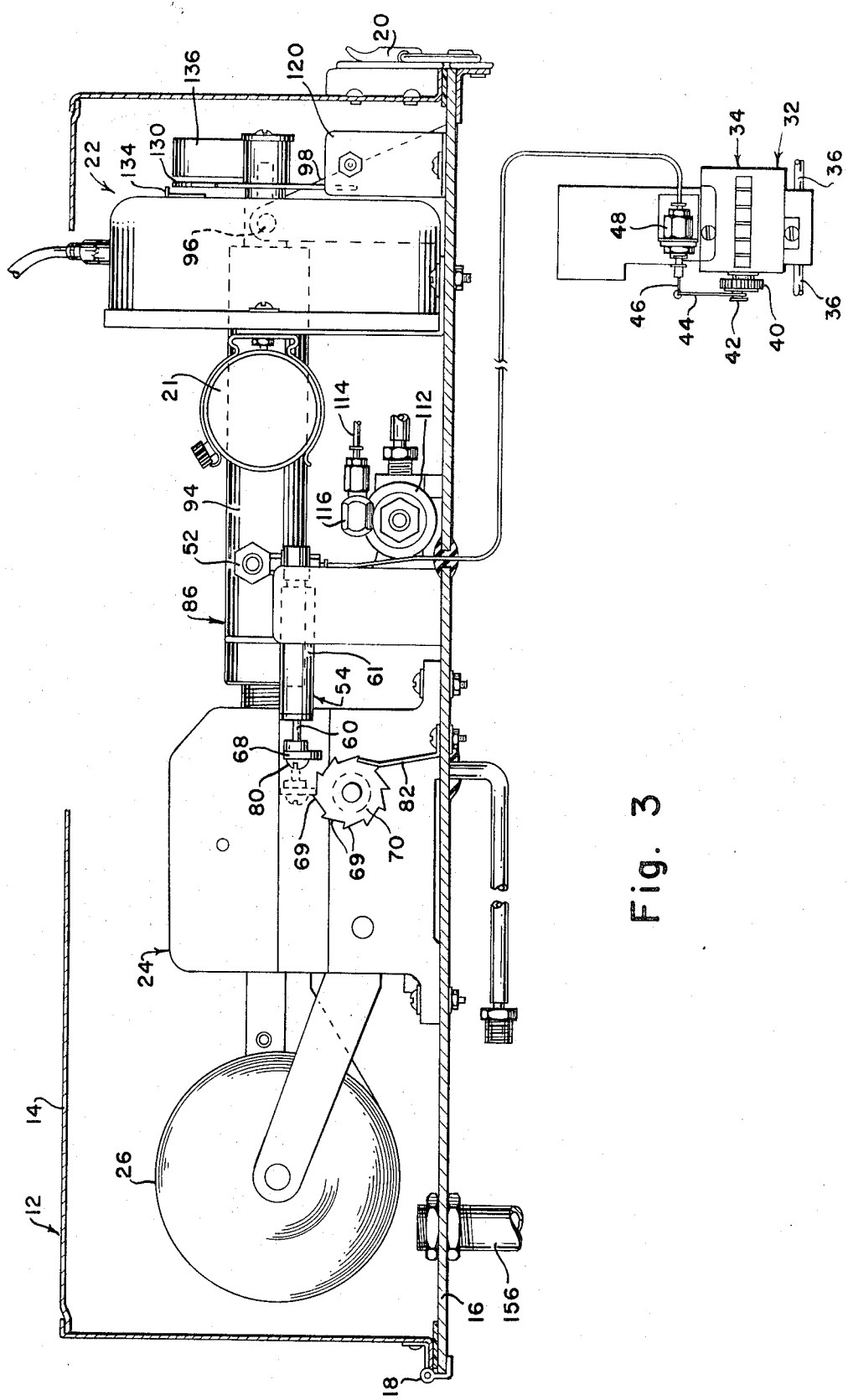
FIG. 3 is a side elevation on line 3—3 of FIG. 2, and with the meter and associated parts shown at the right.

Referring to FIGS. 2 and 3 of the drawings, except for the components shown at the right in FIG. 2, the entire daily print-out system 10 for a gas pipeline is enclosed within a housing 12 having a top hood-type enclosure 14, which is pivotally mounted at the left on a flat base 16 by a hinge 18 and held closed at the right by a clasp 20. In this manner the top 14 can be selectively opened to expose the operating mechanism of the system. The system and operation will be described principally in connection with the schematic representation of FIG. 1, with the details being brought out in connection with the other Figures. The system includes a printer 24 with an odometer 30, and a gas meter 32 with an odometer 34 which meters the gas flowing through a line 36. As the readings on odometer 34 are increased step-by-step the reading on odometer 30 is increased simultaneously. Thus, odometer 30 reads off the amount of gas passing through the pipeline each day, while meter 32 accumulates a continuous reading of the volume of gas flowing through the printing cycle periodically, illustratively every 24 hours, to print the reading on odometer 30, after which the odometer is reset to its zero home position.

The steps of setting odometer 30 and transmitting the printing signal from timer 22 to printer 24, and then operating the printer are performed pneumatically, utilizing as the power source the gas under pressure which is being metered. The mechanism for advancing odometer 30 simultaneously with odometer 34 includes a stepping or indexing unit 54 which has a cylinder 64, a piston 62, a piston rod 60, and a compression spring 61 which urges piston 62 toward the right. Carried by the free end of piston rod 60 is a dog 68 which is adapted to engage successively the teeth 69 on a ratchet wheel 70. Piston rod 60 is shown in its extended position at the end of an indexing stroke to which it is urged by gas pressure on the right-hand end of piston 62 acting against the pressure of spring 64. Hence, when the gas pressure at the right of the piston is reduced, the piston and rod are retracted to the right, and dog 68 falls down behind the next tooth 69, and then when pressure at the right of the piston builds up again, rod 60 is moved to its extended position and turns ratchet wheel 70 the angle of one tooth. Ratchet wheel 70 has ten teeth so that ten stepping operations rotate ratchet wheel 70 and the lowest unit dial of odometer 30 one complete revolution.

The indexing operation of indexing unit 54, is performed by supplying some of the gas being metered to a manifold 56 and thence through a line 50 and a bleed valve 52 to the right-hand end of cylinder 61. The retracting of the piston and rod is effected by opening a valve 48 which discharges gas from the cylinder at a rapid rate so as to reduce the pressure within the cylinder. Valve 52 remains open but is adjusted to supply gas to the cylinder at a relatively low rate which is substantially less than the rate at which gas is discharged through valve 48. Hence, the operation involves opening valve 48 periodically to discharge the gas from the cylinder and thereby retracting rod 60, and then closing the valve so that the gas supplied through valve 52 builds up the pressure in the cylinder again and extends rod 60 to advance the ratchet wheel.

The periodic opening of valve 48 is effected from a shaft 38 of odometer 32 which is rotated to advance the lowest unit dial on odometer 34, and which carries a disc 40 with a crank pin 42. Crank pin 42 is connected through a crank arm 44 to operating arm 46 of valve 48. During the short period of each rotation of disc 40 when operating arm 44 reaches the end of its stroke, it opens valve 48 for a period necessary for the required discharge of gas from cylinder 60 to permit spring 64 to retract piston rod 60. Hence, for each rotation of shaft 38 and disc 40, indexing unit 54 is operated to advance ratchet wheel 70 one-tenth of a rotation. Referring to FIGS. 3 and 5, dog 68 is generally disc-shaped (FIG. 5) with an elongated vertical slot 78, and it is mounted loosely on the squared end of the actuator rod 60 by a screw 80 so that it can slide vertically a limited amount. Hence, it slides upwardly (FIG. 3) as it moves from the full-line position to the broken-line position. When rod 60 is retracted, it slides by gravity action downwardly again behind the next tooth on the ratchet wheel. That provides a positive smooth drive for the ratchet wheel. A spring stop 83 (FIG. 3) prevents inadvertent reverse rotation of the ratchet gear. One complete revolution of the main shaft of odometer 30 causes the lowest numeral on the odometer disc to move through one-tenth of a revolution, thereby to display the next digit thereon and register, for example, the flow of ten cubic feet on the printing mechanism.

As indicated above, odometer 30 is reset after each printing operation, and then the lowest unit dial on odometer 30 is advanced with odometer 32 to indicate a value 10 times the advance in the value of the lowest unit dial on odometer 32. Each printing operation is initiated by a discharge valve 120, which is opened and closed (see also FIG. 2) by timer 22 and controls a pilot valve 112 which operates a four-way control valve 102 for a cylinder-piston unit 86. Unit 86 has an actuating rod 92 which is connected to a crank arm 87 of printer 24, and the printing operation is accomplished by extending the rod sufficiently to turn crank arm 87 counterclockwise through an angle of the order of 45°, and then returning the rod and arm to the position shown. The return movement resets odometer 30 to its zero home position. When valve 120 is opened by timer 22, gas is discharged through a line 118 from cylinder 109 of pilot valve 112. Valve 112 receives gas continuously at a controlled rate from manifold 56 through a line 114 and a bleed valve 116, and is operated somewhat like unit 54. That is, gas flows to unit 112 continuously at a rate controlled by bleed valve 116, and when timer 22 opens valve 120 the gas is discharged at a rapid rate so as to reduce the pressure at the right of the piston to substantial ambient pressure. When valve 120 is closed, the gas pressure builds up at the right of piston 111 and moves the piston and valve element 101 of valve 102 to the full line position. Then, when valve 120 is opened, piston 111 and valve element 101 are urged by spring 113 to the right to the broken line position.

Valve 102 receives gas from manifold 56 (FIGS. 1 and 2) through a line 100 and supplies gas alternatively to the two ends of cylinder 94 of unit 86. When the valve member 101 of valve 102 is in the position shown, gas can flow from valve 102 through line 108 into the left-hand end of cylinder 94 so as to move piston 93 to the right-hand end retracted position as shown. At that time gas is discharged from the right-hand end of cylinder 94 through a line 110 to valve 102 and thence through a port 103. When valve member 101 of valve 102 is moved to the broken line position, the gas under pressure flows through line 110 into the right-hand end of cylinder 94 and gas is discharged from the left-hand end of the cylinder through line 108 to valve 102 and thence through a port 105.

As indicated above, in the illustrative system timer 22 initiates a printing operation every 24 hours. At that time odometer 30 (FIGS. 1 and 3) has accumulated a reading of the gas metered by meter 32 subsequent to the prior printing operation, and the mechanisms are positioned as illustrated schematically in FIG. 1. Timer 22 has a time disc 130 which bears timme indicia and has a time indicating pointer 134, and which makes one revolution every 24 hours. Illustratively, the timer is set so as to initiate a printing operation at 8:00 A.M. each day. Disc 130 has a pin 132 (see also FIG. 4) which is so positioned that it is a predetermined angle clockwise from pointer 134 when the printing signal is to be given, e.g., at 8:00 A.M. A weighted cam member 136 is pivoted on a shaft 138 in front of disc 130 and on the axis of the disc, normally hanging downwardly from the shaft (see FIG. 4). Cam member 136 has a cam surface 140 of the maximum radius of which is the same as the radius of disc 130.

On the trailing edge of cam member 136 there is a notch 142 which is in alignment with pin 132 so that the pin engages the cam member in the notch. Hence, as disc 130 rotates counterclockwise, pin 132 engages cam member 136 at notch 142 and carries it counterclockwise with the disc. Then as pin 132 approaches pointer 134 (FIG. 1), when the center of gravity of cam member 136 moves to the left of a vertical line through the axis of shaft 138, the weight of the cam member causes it to fall freely away from pin 132 down to its normal hanging position at the bottom of its orbit. During that movement the leading edge of cam surface 140 engages a cam-follower 144 on the valve element 121 of discharge valve 120 and opens the valve so as to discharge gas from unit 112 through line 118. Cam surface 140 extends for a sufficient arc relative to its falling speed to insure that valve 120 is opened for a sufficient time to substantially exhaust the gas from cylinder 109 of unit 112. The exhausting of the gas permits spring 113 in unit 112 to push piston 111 to the right-hand end of cylinder 109.

That movement of piston 111 reverses four-way valve 102 so as to exhaust gas from the left-hand end of cylinder 94 (see also FIG. 3) and supply gas under pressure to the right-hand end of the cylinder. That extends rod 92 and swings crank arm 87 to the left and performs the printing operation. In the meantime, cam member 136 falls away from pin 144 and valve 120 recloses. However, valve 116 restricts the flow of gas into cylinder 109 of unit 112 so as to delay the movement of piston 111 and valve element 101 to the left and insures that the printing operation has been completed. After the desired time delay, the continued flow of gas through valve 116 builds up sufficient pressure to move piston 111 back to the full-line position shown, agains the pressure of spring 113. That reverses valve 102 so as to discharge gas from the right-hand end of cylinder 94 and to supply gas under pressure to the left-hand end of the cylinder, thus moving piston 93, rod 92 and crank arm 87 back to their positions as shown. That completes the operating cycle by which printer 24 (see FIGS. 2 and 3) prints on a roll of tape 26 the metered volume of gas which has passed through gas line 36 during the previous 24 hours.

As described above, the printing is accomplished by reciprocating a printing shaft by means of cylinder-piston unit 86. The printing shaft extends outwardly (see FIG. 2) from printer 24 and carries a crank arm 87 which is pivotally connected at its free end to the end coupling or clevis 90 on rod 92. Cylinder 94 is pivotally mounted at the right through a pivot pin 96 on a pair of brackets 98 secured to base 16. This pivotal mounting permits the cylinder to rock slightly during extension and retraction of actuator rod 92 in order to accommodate the vertical movement of the free end of crank arm 87.

Clock 22 (FIGS. 2 and 3) is a low power electric clock of conventional construction and is supplied with electrical power from a 1.5 volt battery. The timing disc 130 (FIG. 4) is provided with 12 equally spaced notches 133 around its periphrey with each interval between two adjacent notches representing a 2-hour period.

It is noted that the end portions 139 and 141 of cam surface 140 are curved radially inwardly with respect to the major portion, so as to provide a lead-in and lead-out guide cam surface for pin 144 as it moves to open and close valve 120. Adjustably clamped to cam member 136 by a screw 148 is a plate 146 which overlies the end of notch 142 so as to be engaged by pin 132. Plate 146 can be adjusted by loosening the screw and moving the plate longitudinally of the notch. That permits precise adjustment of the time at which the center of gravity of the cam member moves past center so as to fall and initiate a printing operation. For example, moving the plate upwardly from the position shown in FIG. 4, the printing operation will be initiated at a slightly earlier time whereas moving the plate downwardly makes it a later time. After the cam member has swung to its lowermost position under the influence of gravity, it will remain in that position until sufficient time has elapsed for clock 22 to move pin 132 into slot 142 and thus into engagement with plate 146. When that occurs, cam member moves with the pin and timing plate 130 in the manner previously described.

Valve 120 is located in a predetermined position with respect to plate 130 so that it is opened only while pin 144 is contacted by cam surface 140 as the cam member falls past pin 144 to its lowermost position. Thus, valve 120 is open for a relatively short period of time which is determined by the length of the cam surface. However, that period of time is sufficient to cause substantial evacuation of pilot valve 112 and the movement of piston 111 to its broken-line position by spring 113. When valve 121 closes, air is supplied to pilot valve 112 through bleed valve 116 at a controlled rate through an orifice in a conventional manner, thereby to provide the desired time delay before piston 111 is moved back to its full-line position of the spring with the resultant reversal of unit 86.

Accordingly, it is seen that a relatively simple and inexpensive system is provided for printing the daily volume of gas supplied to a gas customer or flowing through a distribution line. During operation, each unit of gas measured by the conventional meter 32, e.g., each cubic foot of gas passing through line 36, causes one rotation of shaft 38 of odometer 34. Rotation of shaft 38 first opens valve 48 which vents the cylinder of unit 54 and causes dog 68 (see FIG. 3) to be moved from its broken line position to its solid line position. Valve 48 is then closed by the continued rotation of shaft 38, so that the gas is supplied through valve 52 to cylinder 54, causing dog 68 to be extended and thus turn ratchet gear 70 one step. Ten such successive movements turn ratchet gear 70 through one revolution and causes the printer odometer 30 of printing mechanism 24 to advance one character on its lowest value odometer disc and thus record in the printer odometer ten units of gas measured by the meter 32. Initially, odometer 30 is set to zero and clock 22 is set with its disc 130 clamped by a set screw (not shown) so that pin 138 is positioned so that cam member starts to fall at the beginning of the selected 24-hour period. Accordingly, during the next 24 hours, odometer 30 accumulates a record of the total volume of gas flowing through the pipeline 36. At the completion of the 24-hour period, the cam member has been raised to its uppermost position and its center of gravity moves past the vertical causing it to fall under the influence of gravity and actuate valve 120. When this occurs, pilot valve 112 is vented to the atmosphere, causing actuation of unit 86 and causing rod 92 to operate crank arm 87 and the printing shaft, thereby causing printer 24 to print on the paper tape 26 the total volume of gas accumulated in odometer 30 and advancing the tape from the supply roll. After cam member 132 passes valve 120, the valve closes and permits the gas supplied through valve 111 to return the components to their initial positions. The system then is in condition to accumulate a reading of the volume of gas during the next 24 hours.

In utilizing the present invention, the printed tape 26 is removed at predetermined intervals, e.g., each month, and the charges for the gas are computed, based upon the daily volume of gas. As mentioned, this is particularly important for those industrial users whose rate bases for the gas supply is upon the volume of gas used per day or on successive days. Housing 12 is provided with a vent opening 156 to vent to the atmosphere gas discharged from the various valves.

It is understood that the system can be used with fluids other than gas. The operations can be performed by fluids other than the one being measured. For example, by compressed air or bottled gas. Also, readings can be printed out at shorter or longer periods, and special readings may be printed out for peak load periods when that is desirable. In the illustrative embodiment, clock 22 is battery powered by battery 21 but it can be spring powered. Also, it is understood that other embodiments of the invention may be made without departing from the spirit of the invention and within the scope of the claims.

What is claimed is:

1. In a system for providing a printed tape showing the volume of fluid which is metered during selected periods of time, the combination of, a fluid meter which accumulates a reading of the metered quantity of the fluid, printing means which includes an odometer and mens to print the odometer reading, first fluid-operated means to transfer step-by-step advancing movements to said odometer corresponding to unit measurements of the fluid by said meter, second fluid-operated means to operate said printing means, a control valve to control the supplying of fluid to said second fluid-operated means and thereby operate said printing means, a fluid-operated pilot valve operatively connected to operate said control valve, said pilot valve having operating means connected to said control valve and biasing means urging said operating means toward a first position, said operating means being moved to a second position by supplying fluid under pressure thereto, means to supply fluid under pressure to said pilot valve to move said operating means to said second position, means to discharge fluid from said pilot valve at a rate sufficient to cause said spring means to move said operating means to said second position, and timer means to operate said discharge means periodically and cause said pilot valve to move said control valve and thereby initiate the operation of said printing means.

2. A system as described in claim 1 wherein the fluid being metered is fuel gas and said fluid meter is operated by the flow of the gas, and wherein said timer means initiates the operation of said printing means at a specific time during each 24 hours.

3. A system as described in claim 2 which includes a common gas supply manifold through which fuel gas is supplied to each of said fluid-operated means.

4. A system as described in claim 1 wherein said first fluid-operated means comprises a cylinder-piston unit having a piston and rod assembly forming said operating means, and said biasing means is a coil spring, and which includes a ratchet wheel having ratchet teeth and which is operative to transmit said advancing movements to said odometer, and a ratchet dog mounted on said piston and rod assembly and operative to engage said ratchet teeth in series and to impart said step-by-step advancing movements to said ratchet wheel.

5. A system as described in claim 4 wherein said meter has an odometer shaft which is rotated corresponding to the unit measurements of the fluid, a crank pin attached to said shaft, a crank shaft attached to said crank pin to produce an oscillating movement during each rotation thereof, a fluid valve operated by said oscillating movement to control the operation of said piston and rod assembly and thereby advance said ratchet wheel one step for each revolution of said odometer shaft.

6. A system as described in claim 5 which includes a restrictor through which gas is supplied at a controlled rate to said cylinder-piston unit, and wherein said valve is opened by the movement completing each rotation of said odometer shaft to discharge gas from said cylinder-piston unit to permit said coil spring to move said piston and rod assembly.

7. A system as described in claim 4 wherein said piston and rod assembly moves longitudinally of the rod and tangentially of said ratchet wheel, and wherein said ratchet dog is mounted upon the end of the rod so as to move transversely to the axis of the rod and generally arcuately with the ratchet teeth.

8. A system as described in claim 1 wherein said timer means comprises a clock with a time indicating member which is rotated about a horizontal axis, a weighted cam member swingably mounted to be rotated from a rest position around said axis, drive means mounted to rotate with said time indicating member and adapted to engage and move said cam member from said rest position upwardly around said axis whereby the center of gravity of said cam member is moved over the top of said axis and the cam members falls downwardly by the action of gravity to said rest position and, wherein said discharge means is a fluid valve having a valve-operating member which is engaged by said cam member during its falling movement and which opens said valve member to discharge fluid from said pilot valve.

9. A system as described in claim 8 which includes means to supply gas to the fluid-operated components recited, and wherein said control valve is a four-way valve, and wherein said second fluid-operated means comprises an operating unit with a cylinder to and from which gas is supplied and discharged by said four-way valve, said operating unit having a piston and rod assembly which is moved between an extended position and a retracted position to operate said printing means.

10. A system as described in claim 9 wherein said operating unit is operatively connected at one end to said printing means, and a mounting bracket and pivot means mounting said operating unit at its other end.

11. A system as described in claim 1 wherein said meter accumulates a continuous total, and wherein said odometer is reset to its home position after each operation of said printer means.

12. A system as described in claim 1 wherein the fluid being metered is fuel gas, and wherein said fluid operated components are operated by gas under pressure, and which includes a casing enclosing the components of the system from which gas is discharged, and means to vent the gas from said casing.

13. In combination with meter means which accumulates a total metered quantity, means to read-out in successive cycles the quantity metered for particular periods of time comprising, the combination of, an odometer which is adapted to accumulate the total quantity for a particular period of time, a first fluid-operated cylinder-piston unit to impart step-by-step advance movement to said odometer with the building up of fluid pressure for each step and having spring retracting means, first fluid supply and control means for said first cylinder-piston unit formed by means to supply fluid at a restricted rate and including exhaust means which is opened to discharge fluid whereby fluid pressure builds in said unit when said exhaust means is closed and drops when said exhaust means is open, means to open and then reclose said exhaust means upon the completion of each metering of a predetermined quantity by said meter means whereby fluid is exhausted and said cylinder-piston unit retracts and then advances said odometer one step after the metering of said quantity of said meter means, read-out means to read-out the setting on said odometer, a second fluid-operated cylinder-piston unit having piston means which is movable between an extended piston and a retracted position and is operatively connected to thereby operate said read-out means, control means to supply fluid to said second cylinder-piston unit to extend and retract the piston means between said positions, a third fluid-operated cylinder-piston unit operatively connected to operate said control means, second fluid supply and control means formed by means to supply fluid at a controlled rate to said third cylinder-piston unit and exhaust means to discharge fluid therefrom, and timer means to open the last named of said exhaust means at the end of each of said periods of time and thereby initiate a read-out cycle.

14. Apparatus as described in claim 13 wherein the fluid being measured is gas and wherein gas under pressure is used to operate the fluid-operated components, and wherein said timer means comprises a clock, a weight which is elevated by the operation of said clock and falls from its elevated position at a predetermined time to thereby initiate the read-out cycle.

15. Apparatus as described in claim 14 wherein said weight is a cam member which is swingably mounted to be rotated about an axis, and which falls freely from an elevated position to a rest position.

16. In a system for metering and recording metered quantities, the combination of, resetable means to accumulate the metered quantities, a meter to meter the quantities on said meter and to simultaneously advance said resetable means, printer means to print the accumulated total on said resetable means, actuating means to operate said printer means and to reset said resetable means after each printing operation, and timer means to initiate the operation of said actuating means in accordance with a predetermined time cycle.

17. A system as described in claim 16 wherein fuel gas is metered and gas is utilized to transmit the metered quantities of said resetable means and to operate said printer means and said actuating means.

* * * * *